United States Patent [19]

Jonninen

[11] Patent Number: 5,405,092
[45] Date of Patent: Apr. 11, 1995

[54] SCREEN CRUSHER FOR SOIL MATERIALS

[75] Inventor: Markku Jonninen, Hollola, Finland

[73] Assignee: Ideachip Oy, Finland

[21] Appl. No.: 34,242

[22] Filed: Mar. 22, 1993

[30] Foreign Application Priority Data

Mar. 4, 1993 [FI] Finland ................ 930127

[51] Int. Cl.⁶ .............................. B02C 1/10
[52] U.S. Cl. ............................. 241/27; 37/403; 37/443; 299/70; 241/101.7
[58] Field of Search ......... 37/443, 403, 903, 447, 37/408, 407, 349; 241/101.7, 69, 73, 189.1, 191, 27; 299/70

[56] References Cited

U.S. PATENT DOCUMENTS

| | | | |
|---|---|---|---|
| 3,987,971 | 10/1976 | McClure | 241/73 |
| 4,196,862 | 4/1980 | Tagawa | 241/101.7 X |
| 4,369,927 | 1/1983 | Rozeboom | 241/73 |
| 4,776,524 | 10/1988 | Sakato | 241/101.7 |
| 4,852,277 | 8/1989 | Ward | 37/443 X |
| 4,943,165 | 7/1990 | Boggs | 37/443 X |
| 5,060,732 | 10/1991 | Baskett | 37/903 X |
| 5,172,498 | 12/1992 | Wack | 37/443 |

*Primary Examiner*—Randolph A. Reese
*Assistant Examiner*—Robert E. Pezzuto
*Attorney, Agent, or Firm*—Lalos & Keegan

[57] ABSTRACT

Soil materials are screened and crushed simultaneously in a bucket of an excavating machine having its back wall replaced by rotatable crushing and screening elements. The crushed and screened materials fall down through the back wall and the non-crushable materials with size exceeding the size of screen openings remain in the bucket for dumping in the pile of a coarse pieces.

2 Claims, 3 Drawing Sheets

SCREEN CRUSHER FOR SOIL MATERIALS

BACKGROUND OF THE INVENTION

The present invention relates to a screen crusher for soil materials to be used in the bucket of an excavating machine. The back wall of the machine of the present invention, between a bottom plate and a pivoting joint associated with a bucket boom, is designed as a crushing screen. The present invention includes rotatable crusher elements which, while rotating, crush whatever crushable material is contained in the bucket and at the same time deliver crushed material out of the bucket.

Thus, a screen crusher of the invention is intended for use as an excavating machine accessory to replace a conventional bucket. The device can be used for crushing, screening, ventilating and mixing composts, top soils and moulds.

SUMMARY OF THE INVENTION

An object of the invention is to provide a bucket-fitting crusher screen device, capable of effectively exploiting the power of a shovel excavator for the crushing of material while providing a desired screening action.

In order to achieve this objective, a screen crusher of the invention is characterized in that the rotating shafts of crusher elements are substantially horizontal, i.e. substantially parallel to the bucket pivoting axle, and that the crusher elements include teeth separated from each other by spacer plates which surround the rotating shafts of crusher elements at an axial distance from each other, said distance being selected to match a desired screening coarseness and the diameter of spacer plates being selected to almost match the distance between rotating shafts, so that the spacer plates together with crusher teeth make up the crusher screen.

BRIEF DESCRIPTION OF THE DRAWINGS

One exemplary embodiment of the invention will now be described in more detail with reference made to the accompanying drawings, in which.

Figure 1:
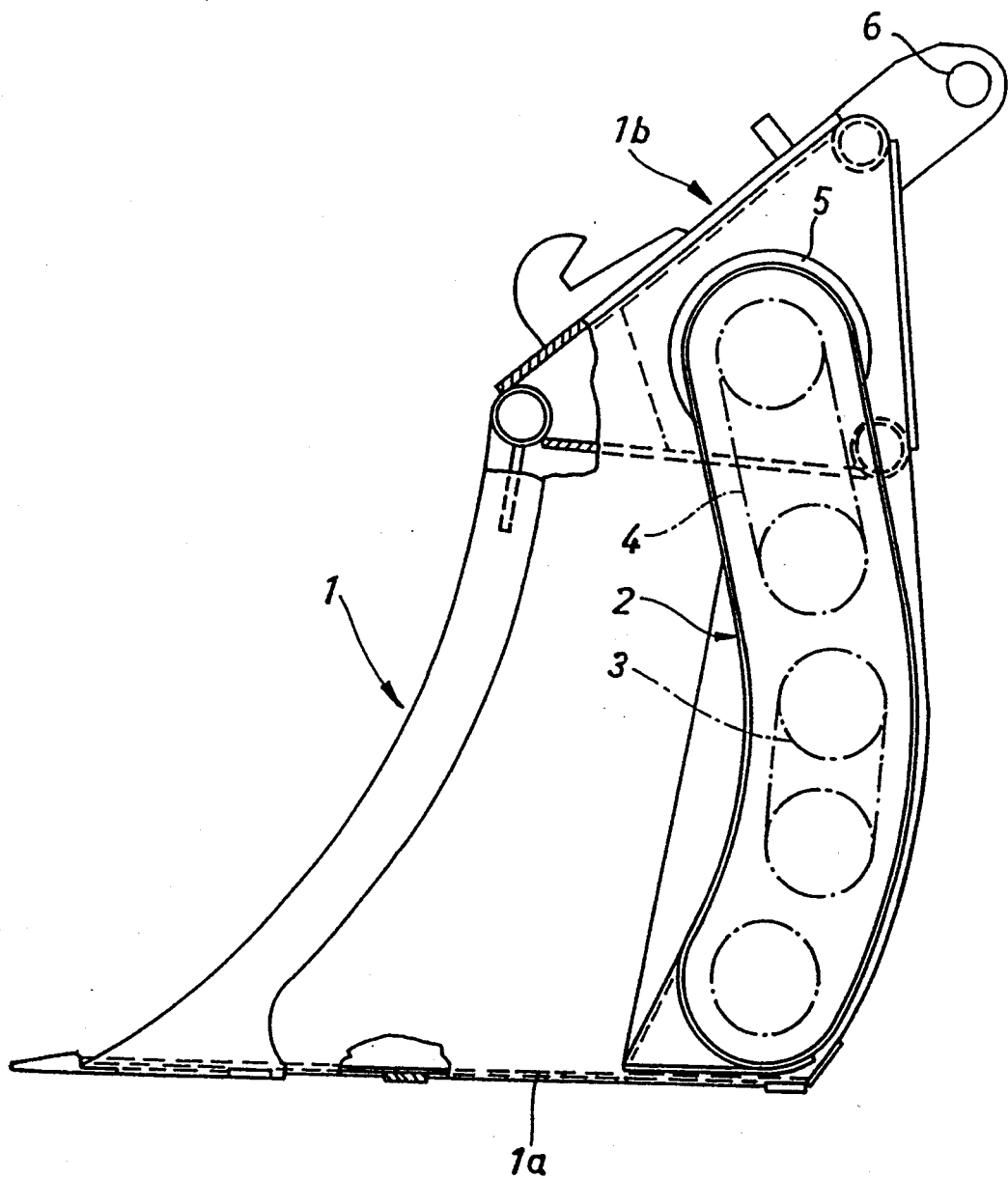
FIG. 1 is a side view of a screen crusher of the invention.

In the illustrated case, the screen crusher is included in an excavator bucket 1, which is a dipper type shovel. Naturally, it is also possible to use a back-acting type of shovel, whereby the structure of fastening elements 1b is changed accordingly. Thus, the bucket 1 is mounted by means of fastening elements 1b and a pivoting joint 6 on the bucket boom of an excavating machine. A screen crusher of the invention can also be constructed in the bucket of a bucket loader.

Between a bucket bottom plate 1a and pivoting joint 6 is a back wall, which is formed by a crusher screen 2 and through which the crushed and screened material trickles as the crusher screen is in operation. In this situation, the bucket 1 is turned into a position, wherein said back wall 2 serves as the bucket floor and the bottom plate 1a faces more or less upwards.

Figure 2:
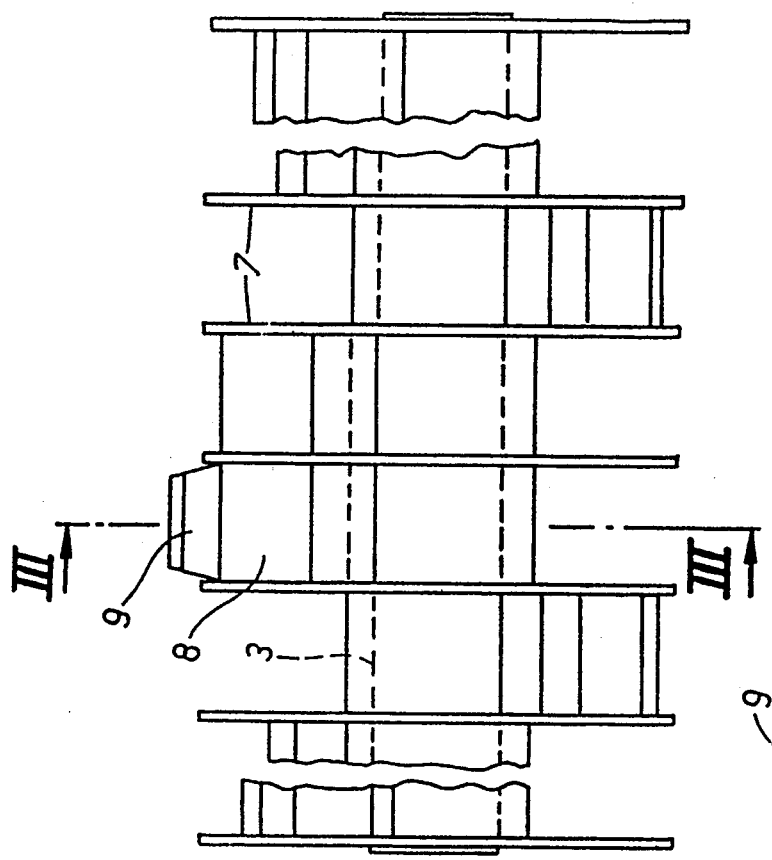
FIG. 2 shows one crushing shaft with its screening and crushing elements.
Figure 4:
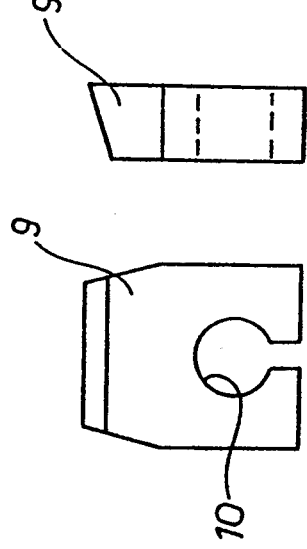
FIG. 4 shows a crushing tooth seen from two different sides.
Figure 3:
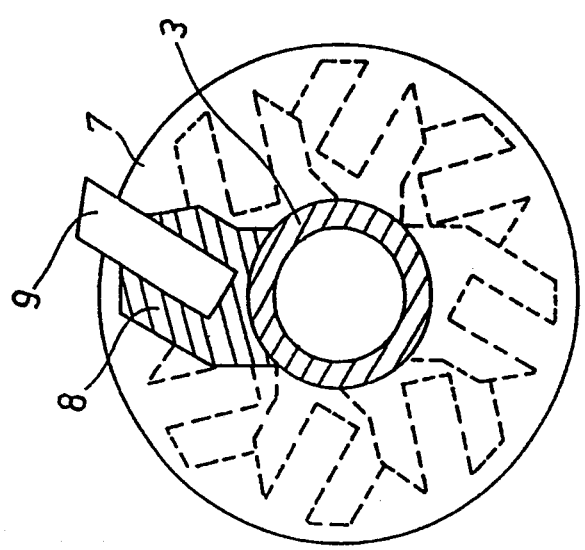
FIG. 3 shows the crushing shaft of FIG. 2 in a cross-sections taken along a line III—III in FIG. 2.
Figure 5A:
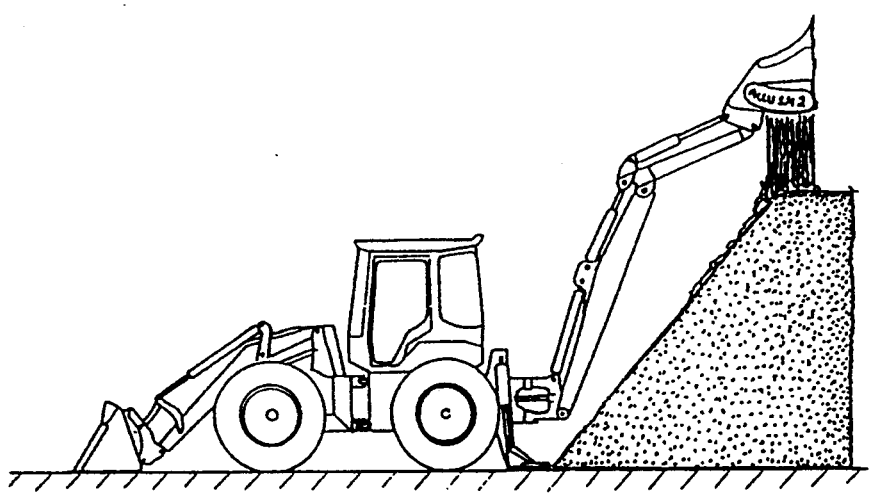
FIGS. 5A-C show general side views of the screen crusher in use with different types of excavating machines.
Figure 5B:
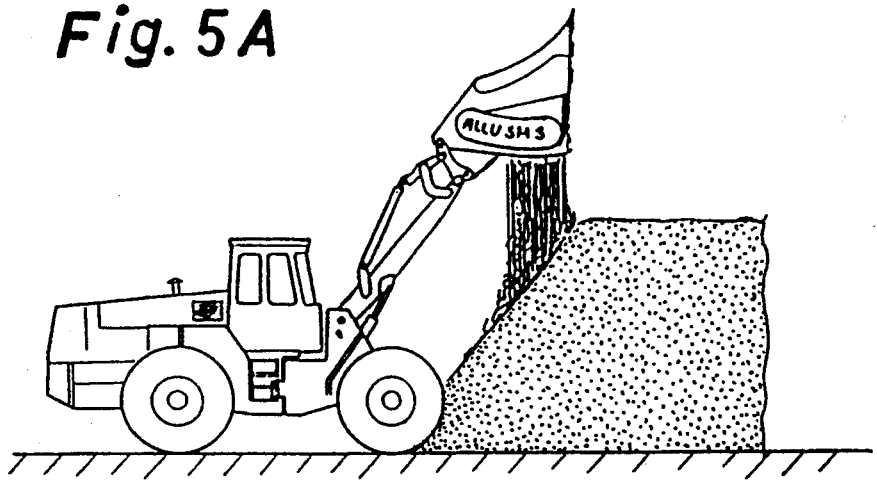
Figure 5C:
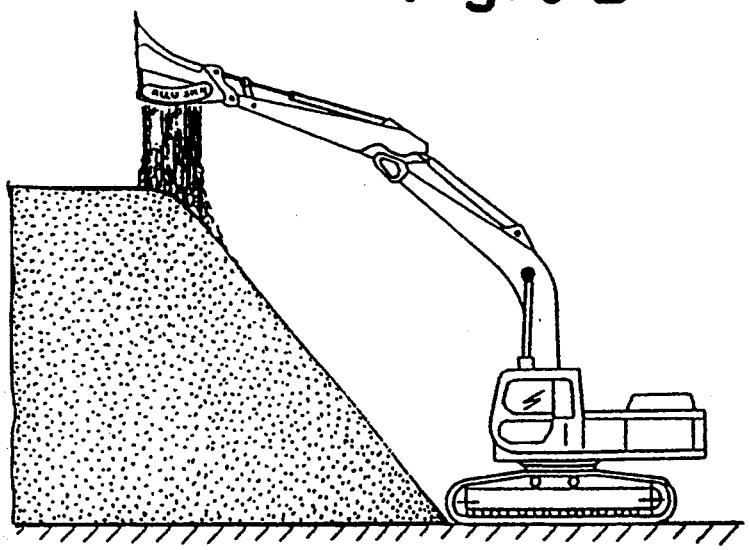

A hydraulic motor 5 operates chains 4 for rotating shafts 3, which are provided with screening and crushing elements as shown in FIGS. 2 and 3. Shafts 3 are substantially horizontal, i.e. parallel to the bucket pivoting axle 6. Shaft 3 is surrounded by spacer plates 7 which are mounted on shaft 3 at an axial distance from each other. This distance is selected to match a desired screening coarseness and may thus vary on screen crushers used for varying purposes. Fastening elements 8 for crushing teeth 9 are welded on shaft 3 between spacer plates 7 in a manner that the position thereof turns in a spiral fashion while progressing in the axial direction of shaft 3. Fastening elements 8 are provided with recesses for accommodating and securing said crushing teeth 9 therein by means of pins driven through holes 10. The tips of teeth 9 extend slightly beyond the peripheral line of spacer plates 7. The diameter of spacer plates 7 is selected to almost match the distance between rotating shafts 3 whereby, on adjacent shafts, the peripheries of spacer plates 7 nearly touch each other. Thus, shafts 3, together with their spacer plates 7, provide a sort of sieving screen, through which crushing elements 9 deliver mass during the rotation of shafts 3. Larger solid pieces, too large to penetrate through the screen and to be grabbed and carried by teeth 9 for effecting the crushing action, remain finally in bucket 1 and can be subsequently dumped elsewhere in the pile of coarse pieces. For example, larger stones and pieces of wood can thus be removed from crushed and screened mass.

In the illustrated case, bucket 1 includes four tubular shafts 3, which all have the same rotating direction. Naturally, the number and rotating direction of shafts may vary.

I claim:

1. A method for screening and crushing of soil materials, comprising the steps of
   lifting the materials in a bucket of an excavating machine or a bucket loader, a back wall of said bucket comprising rotatable crushing and screening elements;
   simultaneously screening and crushing the materials in said bucket by rotating said crushing and screening elements, whereby the crushed and screened materials fall down through said back wall and the non-crushable materials with size exceeding the size of screen openings remain in said bucket for dumping in a pile of coarse pieces.

2. A screen crusher for soil materials to be used in a bucket of an excavating machine or a bucket loader including a back wall between a bottom plate (1a) and a pivoting joint (6) associated with a bucket boom including rotatable crushing elements (9) which, during the rotation thereof, crush material contained in the bucket and at the same time deliver crushed material out of the bucket, including rotating shafts (3) for said crushing elements, said shafts being substantially horizontal and substantially parallel to the bucket pivoting joint (6), said crushing elements including teeth (9) separated from each other by spacer plates (7), which surround said rotating shafts (3) for crushing elements at an axial distance from each other, said distance being selected to match a desired screening coarseness and the diameter of said spacer plates (7) being selected to almost match the distance between rotating shafts (3) in a manner that said spacer plates (7), together with crushing teeth (9), make up a crushing screen (2).

* * * * *